(12) United States Patent
Savvides et al.

(10) Patent No.: US 10,354,159 B2
(45) Date of Patent: *Jul. 16, 2019

(54) METHODS AND SOFTWARE FOR DETECTING OBJECTS IN AN IMAGE USING A CONTEXTUAL MULTISCALE FAST REGION-BASED CONVOLUTIONAL NEURAL NETWORK

(71) Applicant: Carnegie Mellon University, Pittsburgh, PA (US)

(72) Inventors: Marios Savvides, Pittsburgh, PA (US); Khoa Luu, Pittsburgh, PA (US); Chenchen Zhu, Pittsburgh, PA (US)

(73) Assignee: Carnegie Mellon University, Pittsburgh, PA (US)

( * ) Notice: Subject to any disclaimer, the term of this patent is extended or adjusted under 35 U.S.C. 154(b) by 22 days.

This patent is subject to a terminal disclaimer.

(21) Appl. No.: 15/697,015

(22) Filed: Sep. 6, 2017

(65) Prior Publication Data
US 2018/0068198 A1 Mar. 8, 2018

Related U.S. Application Data

(60) Provisional application No. 62/495,216, filed on Sep. 6, 2016.

(51) Int. Cl.
| | |
|---|---|
| *G06K 9/32* | (2006.01) |
| *G06K 9/62* | (2006.01) |
| *G06N 3/04* | (2006.01) |
| *G06N 3/08* | (2006.01) |

(52) U.S. Cl.
CPC ............ *G06K 9/3233* (2013.01); *G06K 9/62* (2013.01); *G06N 3/04* (2013.01); *G06N 3/0454* (2013.01); *G06N 3/084* (2013.01)

(58) Field of Classification Search
None
See application file for complete search history.

(56) References Cited

U.S. PATENT DOCUMENTS

| | | | |
|---|---|---|---|
| 2016/0321784 A1* | 11/2016 | Annapureddy | G06K 9/66 |
| 2017/0011281 A1* | 1/2017 | Dijkman | G06K 9/66 |
| 2017/0083792 A1* | 3/2017 | Rodriguez-Serrano | G06N 3/0454 |

(Continued)

*Primary Examiner* — Kevin Ky
(74) *Attorney, Agent, or Firm* — Downs Rachlin Martin PLLC

(57) ABSTRACT

Methods of detecting an object in an image using a convolutional neural-network-based architecture that processes multiple feature maps of differing scales from differing convolution layers within a convolutional network to create a regional-proposal bounding box. The bounding box is projected back to the feature maps of the individual convolution layers to obtain a set of regions of interest (ROIs) and a corresponding set of context regions that provide additional context for the ROIs. These ROIs and context regions are processed to create a confidence score representing a confidence that the object detected in the bounding box is the desired object. These processes allow the method to utilize deep features encoded in both the global and the local representation for object regions, allowing the method to robustly deal with challenges in the problem of object detection. Software for executing the disclosed methods within an object-detection system is also disclosed.

22 Claims, 9 Drawing Sheets

(56) References Cited

U.S. PATENT DOCUMENTS

2018/0032796 A1* 2/2018 Kuharenko ....... G06F 17/30256
2018/0211099 A1* 7/2018 Ranjan ............... G06K 9/00248
2018/0225550 A1* 8/2018 Jacobsen ............. G06K 9/4619

* cited by examiner

METHODS AND SOFTWARE FOR DETECTING OBJECTS IN AN IMAGE USING A CONTEXTUAL MULTISCALE FAST REGION-BASED CONVOLUTIONAL NEURAL NETWORK

RELATED APPLICATION DATA

This application claims the benefit of priority of U.S. Provisional Patent Application Ser. No. 62/495,216, filed Sep. 6, 2016, and titled "Very Deep Neural Network with Auto Context R-CNN for Object Detection and Auto Context R-CNN for Unconstrained Face Detection," which is incorporated by reference herein in its entirety.

FIELD OF THE INVENTION

The present invention generally relates to the field of detecting objects in images. In particular, the present invention is directed to methods and software for detecting objects in images using a contextual multiscale fast region-based convolutional neural network.

BACKGROUND

Automated detection of objects within digital images is a technology that has many benefits. For example, automated face detection is useful in access control, surveillance, and security operations, among others. Automated object-detection technology has progressed significantly as computing power has been increased over the years, allowing for faster and faster execution of complex algorithms. Along with increases in processing power has come improvements to object-detection processing architectures.

For example, robust face detection in the wild is one of the ultimate components for supporting various facial related problems, such as unconstrained face recognition, facial periocular recognition, facial landmarking and pose estimation, facial expression recognition, and 3D facial model construction, among others. Although the face-detection problem has been intensely studied for decades, resulting in various commercial applications, it still meets problems in some real-world scenarios due to numerous challenges, including heavy facial occlusions, extremely low resolutions, strong illumination, exceptional pose variations, image or video compression artifacts, etc.

SUMMARY OF THE DISCLOSURE

In one implementation, the present disclosure is directed to a method of processing an image to detect the presence of one or more objects of a desired classification in the image. The method being performed in an object-detection system includes receiving the image and storing the image in computer memory; sequentially convolving the image in a series of at least two convolution layers to create a corresponding series of feature maps of differing scales; pooling at least one of the feature maps to create a corresponding at least one pooled feature map; normalizing, relative to one another, the at least one pooled feature map and each of the feature maps not pooled to create a series of normalized feature maps; concatenating the series of normalized feature maps together with one another to create a concatenated feature map; dimensionally reducing the concatenated feature map to create a dimensionally reduced feature map; processing the dimensionally reduced feature map in a first set of fully connected layers to create a proposal comprising a bounding box corresponding to a suspected object of the desired classification in the image and an objectness score for the suspected object, wherein the first set of fully connected layers has been trained on the desired classification; if the objectness score exceeds a predetermined threshold, then projecting the bounding box back to each of the at least two feature maps to identify a region of interest in each of the at least two feature maps; identify a context region for each region of interest; pooling each of the regions of interest to create a corresponding pooled region of interest; pooling each of the context regions to create a corresponding pooled context region; normalizing, relative to one another, the pooled regions of interest to create a set of normalized regions of interest; normalizing, relative to one another, the pooled context regions to create a set of normalized context regions; concatenating the normalized regions of interest with one another to create a concatenated region of interest; concatenating the normalized context regions with one another to create a concatenated context region; dimensionally reducing the concatenated region of interest to create a dimensionally reduced region of interest; dimensionally reducing the concatenated context region to create a dimensionally reduced context region; processing the dimensionally reduced region of interest and the dimensionally reduced context region in a second set of fully connected layers to generate a determined classification for the region of interest, wherein the second set of fully connected layers is trained on the desired classification; and if the determined classification corresponds to the desired classification, then annotating the image with an identification of the bounding box and storing the image and the identification in the computer memory.

In another implementation, the present disclosure is directed to a computer-readable storage medium containing computer-executable instructions for performing a method of processing an image to detect the presence of one or more objects of a desired classification in the image. The method for being performed in an object-detection system executing the computer-executable instructions includes receiving the image and storing the image in computer memory; sequentially convolving the image in a series of at least two convolution layers to create a corresponding series of feature maps of differing scales; pooling at least one of the feature maps to create a corresponding at least one pooled feature map; normalizing, relative to one another, the at least one pooled feature map and each of the feature maps not pooled to create a series of normalized feature maps; concatenating the series of normalized feature maps together with one another to create a concatenated feature map; dimensionally reducing the concatenated feature map to create a dimensionally reduced feature map; processing the dimensionally reduced feature map in a first set of fully connected layers to create a proposal comprising a bounding box corresponding to a suspected object of the desired classification in the image and an objectness score for the suspected object, wherein the first set of fully connected layers has been trained on the desired classification; if the objectness score exceeds a predetermined threshold, then projecting the bounding box back to each of the at least two feature maps to identify a region of interest in each of the at least two feature maps; identify a context region for each region of interest; pooling each of the regions of interest to create a corresponding pooled region of interest; pooling each of the context regions to create a corresponding pooled context region; normalizing, relative to one another, the pooled regions of interest to create a set of normalized regions of interest; normalizing, relative to one another, the pooled context regions to create a set of normalized context regions; concatenating the normalized regions of interest with one another to create a concatenated region of interest; concatenating the normalized context regions with one another to create a concatenated context region; dimensionally reducing the concatenated region of interest to create a dimensionally reduced region of interest; dimensionally reducing the concatenated context region to create a dimensionally reduced context region; processing the dimensionally reduced region of interest and the dimensionally reduced context region in a second set of fully connected layers to generate a determined classification for the region of interest, wherein the second set of fully connected layers is trained on the desired classification; and if the determined classification corresponds to the desired classification, then annotating the image with an identification of the bounding box and storing the image and the identification in the computer memory.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

DETAILED DESCRIPTION

I. Overview

Figure 1:
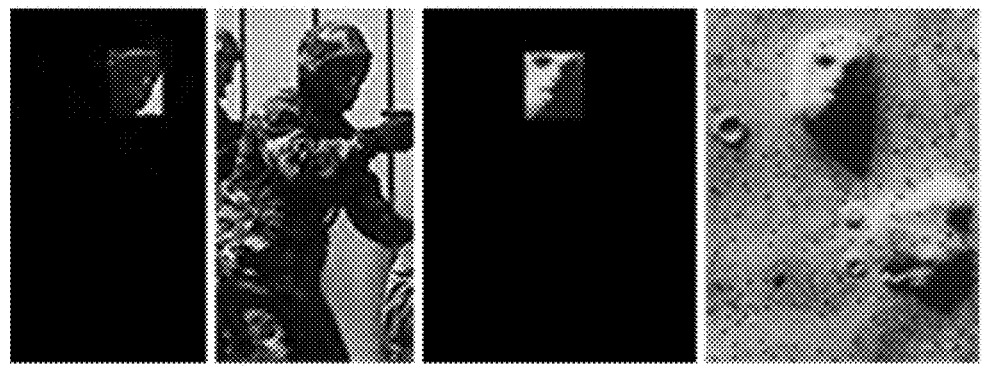
FIG. 1 is a set of photographs illustrating usefulness of contextual information in determining the confidence of detecting occurrence of an object in an image.

In one aspect, the present invention is directed to a Convolutional Neural Network (CNN)-based object-detection system capable of detecting occurrence(s) of one or more desired objects within a given input image. Each object may be virtually any object desired to be detected in the image, such as a human face, a particular type of vehicle, or a particular type of weapon, to name just a few. An improvement to object-detection technology afforded by an object-detection system of the present invention is particularly suited for detecting each object even if the object occupies a relatively small portion of the overall image, is poorly or non-uniformly lit, is blurry, and/or is in an off-axis orientation, among other things that make object detection difficult or impossible using traditional object-detection methodologies.

In contrast to conventional CNN-based object-detection methods, a CNN-based object-detection method according to the present invention not only assembles and processes feature maps and regions of interest (ROIs) of multiple scales, but it also considers, at multiple scales, portions of the image surrounding the ROIs to capture contextual information that help increase the confidence that a desired object is present in each ROI. These enhancements to conventional CNN-based object-detection methods make the performance of an object-detection method of the present invention superior to conventional CNN-based object-detection technology, especially when detecting objects that are relatively small compared to the overall image being processed.

This disclosure presents an advanced CNN based approach named Contextual Multi-Scale Region-based CNN (CMS-RCNN) to handle the problem of face detection in digital face images collected under numerous challenging conditions, such as heavy facial occlusion, illumination, extreme off-angle, low-resolution, scale difference, etc. Due to face detection being a primary use of CMS-RCNN, the examples and experiments described herein are focused on human face detection. However those skilled in the art will readily understand how to apply the principles disclosed herein to virtually any desired type of object.

Generally, a CMS-CNN architecture of the present disclosure allows the network to simultaneously look at multiscale features, as well as to explicitly look outside facial regions as the potential body regions. In other words, the process tries to mimic the process of face detection by a human in a sense that when humans are not sure about a face, seeing the body will increase confidence. Additionally this architecture also helps to synchronize both the global semantic features in high level layers and the localization features in low level layers for facial representation. Therefore, it is able to robustly deal with the challenges in the problem of unconstrained face detection.

The CMS-CNN method uses the Multiscale Region Proposal Network (MS-RPN) (see U.S. patent application Ser. No. 15/698,887, filed on Sep. 8, 2017, and titled "METHODS AND SOFTWARE FOR DETECTING OBJECTS IN IMAGES USING A MULTISCALE FAST REGION-BASED CONVOLUTIONAL NEURAL NETWORK", which is incorporated herein by reference for its teachings of MS-RPN and MS-FRCNN) to generate a set of region candidates and the CMS-CNN to do inference on the region candidates of facial regions. A confidence score and bounding box regression are computed for every candidate. In the end, the face detection system is able to decide the quality of the detection results by thresholding these generated confidence scores in given face images.

An example instantiation of a CMS-CNN object-detection system is evaluated on two challenging face detection databases and compared against numerous recent face detection methods. Firstly, the proposed CMS-RCNN method is compared against four strong baselines on the Wider Face Dataset, a large scale face detection benchmark database. This experiment showed the method's capability to detect face images in the wild, for example, under occlusions, differing illumination, differing facial poses, and low-resolution conditions, etc. As discussed below, the method outperformed the baselines by a large margin in all easy, medium, and hard partitions. The method was also benchmarked on the Face Detection Data Set and Benchmark (FDDB), a dataset of face regions designed for studying the problem of unconstrained face detection. The experimental results showed that the CMS-RCNN approach consistently achieved highly competitive results against the other state-of-the-art face detection methods.

The following disclosure is organized as follows. Section II summarizes prior work in face detection and reviews a general deep-learning framework, the background, as well as the limitations of the Faster R-CNN in the problem of face detection. Section III introduces an example CMS-RCNN approach to the problem of robust face detection. Section IV presents experimental face detection results and comparisons obtained using the disclosed proposed approach on two challenging face detection databases, i.e., the Wider Face and the FDDB databases.

II. Related Work and its Limitations

Face detection has been a well-studied area of computer vision. One of the first well-performing approaches to the problem was the Viola-Jones face detector. It was capable of performing realtime face detection using a cascade of boosted simple Haar classifiers. The concepts of boosting and using simple features have been the basis for many different approaches since the Viola-Jones face detector. These early detectors tended to work well on frontal face images but not very well on faces in different poses. As time has passed, many of these methods have been able to deal with off-angle face detection by utilizing multiple models for the various poses of the face. This increases the model size but does afford more practical uses of the methods. Some approaches have moved away from the idea of simple features but continue to use the boosted learning framework. For example, others have used SURF cascades for general object detection but also showed good results on face detection.

More recent work on face detection has tended to focus on using different models such as a Deformable Parts Model (DPM). Some have combined the problems of face detection, pose estimation, and facial landmarking into one framework. By utilizing all three aspects in one framework, those frameworks were able to outperform the state-of-the-art at the time on real world images. Others extended this work by incorporating group sparsity in learning in which landmarks are the most salient for face detection as well as incorporating 3D models of the landmarks in order to deal with pose. Still others have combined ideas from both of these approaches by utilizing a cascade detection framework while simultaneously localizing features on the face for alignment of the detectors. Similarly, others have been able to use hierarchical DPMs not only to achieve good face detection in the presence of occlusion but also landmark localization. However, others were able to show that both DPM models and rigid template detectors similar to the Viola-Jones detector have a lot of potential that has not been adequately explored. By retraining these models with appropriately controlled training data, they were able to create face detectors that perform similarly to other, more complex state-of-the-art face detectors.

All of these approaches to face detection were based on selecting a feature extractor beforehand. However, there has been work done in using a ConvNet to learn which features are used to detect faces. Neural networks have been around for a long time but have been experiencing a resurgence in popularity due to hardware improvements and new techniques resulting in the capability to train these networks on large amounts of training data. One group utilized a cascade of CNNs to perform face detection. The cascading networks allowed them to process different scales of faces at different levels of the cascade while also allowing for false positives from previous networks to be removed at later layers in a similar approach to other cascade detectors. Another group approached the problem from a different perspective more similar to a DPM approach. In their method, the face is broken into several facial parts such as hair, eyes, nose, mouth, and beard. By training a detector on each part and combining the score maps intelligently, they were able to achieve accurate face detection, even under occlusions. Both of these methods require training several networks in order to achieve their high accuracy. The methods of the present disclosure, on the other hand, can be trained as a single network, end-to-end, allowing for less annotation of training data needed while maintaining highly accurate face detection.

Ideas for using contextual information in object detection have been studied in several recent works with very high detection accuracy. One group reviewed the role of context in contemporary, challenging object-detection in their empirical evaluation analysis. In their conclusions, the context information not only reduced the overall detection errors, but also the remaining errors made by the detector were more reasonable. Another group introduced an advanced object detector method named Inside-Outside Network (ION) to exploit information both inside and outside the region of interest. In their approach, the contextual information outside the region of interest was incorporated using spatial recurrent neural networks. Inside the network, skip pooling was used to extract information at multiple scales and levels of abstraction. Recently, yet another group presented the MultiPath network with three modifications to the standard Fast RCNN object detector, namely, provide skip connections that give the detector access to features at multiple network layers, a foveal structure to exploit object context at multiple object resolutions, and an integral loss function and corresponding network adjustment that improve localization. The information in their proposed network can flow along multiple paths. Their MultiPath network is combined with DeepMask object proposals to solve the object detection problem.

Unlike all the previous approaches that select a feature extractor beforehand and incorporate a linear classifier with the depth descriptor beside RGB channels, a CMS-RCNN method of the present disclosure solves the problem under a deep learning framework where the global and the local context features, i.e., multiscaling, are synchronized to Faster R-CNNs in order to robustly achieve semantic detection.

Recent studies in deep ConvNets have achieved significant results in object detection, classification and modeling. In this section, various well-known Deep ConvNets are reviewed. Then, current limitations of the Faster R-CNN, one of the state-of-the-art deep ConvNet methods in object detection, are examined in the defined context of the face detection.

II.1. Region-Based Convolution Neural Networks

One of the most important approaches for the object detection task is the family of Region-based Convolution Neural Networks (R-CNN). R-CNN, the first generation of this family, applies the high-capacity deep Convolutional Neural Network (ConvNet) to classify given bottom-up region proposals. Due to the lack of labeled training data, it adopts a strategy of supervised pre-training for an auxiliary task followed by domain-specific fine-tuning. Then, the ConvNet is used as a feature extractor, and the system is further trained for object detection with Support Vector Machines (SVM). Finally, it performs bounding-box regression. The method achieves high accuracy but is very time-consuming. The system takes a long time to generate region proposals, extract features from each image, and store these features in a hard disk, which also takes up a large amount of space. At testing time, the detection process takes 47 s per image using VGG-16 network implemented in GPU due to the slowness of feature extraction. In other words, R-CNN is slow because it processes each object proposal independently without sharing computation.

Fast R-CNN solves this problem by sharing the features between proposals. The network is designed to only compute a feature map once per image in a fully convolutional style, and to use ROI-pooling to dynamically sample features from the feature map for each object proposal. The network also adopts a multi-task loss, i.e. classification loss and bounding-box regression loss. Based on the two improvements, the framework is trained end-to-end. The processing time for each image significantly reduced to 0.3 s. Fast R-CNN accelerates the detection network using the ROI-pooling layer. However the region proposal step is designed out of the network, and hence still remains a bottleneck, which results in a sub-optimal solution and dependence on the external region proposal methods.

Faster R-CNN addresses the problem with Fast R-CNN by introducing the RPN. An RPN is implemented in a fully convolutional style to predict the object bounding boxes and the objectness scores. In addition, the anchors are defined with different scales and ratios to achieve the translation invariance. The RPN shares the full-image convolution features with the detection network. Therefore the whole system is able to complete both proposal generation and detection computation within 0.2 s using very deep VGG-16 model. With a smaller ZF model, it can reach the level of real-time processing.

II.2. Limitations of Faster R-CNN

The Region-based CNN family, for example, Faster R-CNN and its variants, achieves the state-of-the-art performance results in object detection on the PASCAL VOC dataset. These methods can detect objects such as vehicles, animals, people, chairs, and etc. with very high accuracy. In general, the defined objects often occupy the majority of a given image. However, when these methods are tested on the challenging Microsoft COCO dataset, the performance drops a lot, since images contain more small, occluded and incomplete objects. Similar situations happen in the problem of face detection. Some instantiations of methods of the present disclosure focus on detecting only facial regions that are sometimes small, heavily occluded and of low resolution.

The detection network in Faster R-CNN is unable to robustly detect such tiny faces. The intuition point is that the Regions of Interest pooling layer, i.e. ROI-pooling layer, builds features only from the last single high level feature map. For example, the global stride of the "conv5" layer in the VGG-16 model is 16. Therefore, given a facial region with the sizes less than 16×16 pixels in an image, the projected ROI-pooling region for that location will be less than 1 pixel in the "conv5" layer, even if the proposed region is correct. Thus, the detector will have much difficulty to predict the object class and the bounding box location based on information from only one pixel.

II.3. Other Face Detection Method Limitations

Other challenges in object detection in the wild include occlusion and low-resolution. For face detection, it is very common for people to wear items like sunglasses, scarves, and hats, which occlude faces. In such cases, the methods that only extract features from faces do not work well. For example, Faceness considers finding faces through scoring facial parts responses by their spatial structure and arrangement, which works well on clear faces. But when facial parts are missing due to occlusion, facial parts become harder to detect. In these cases, body context information can play its role. As an example of context-dependent objects, faces often come together with the human body. Even though the faces are occluded, human viewers can still locate it only by seeing the whole human body. Similar advantages exist for faces at low-resolution, i.e., tiny faces. The deep features cannot tell much about tiny faces, since their receptive field is too small to be informative. Introducing context information can extend the area to extract features and make them meaningful. On the other hand, the context information also helped with reducing false detection as discussed previously, since context information tells the difference between real faces with bodies and face-like patterns without bodies.

III. Detailed Example of CMS-RCNN

Figure 3A:
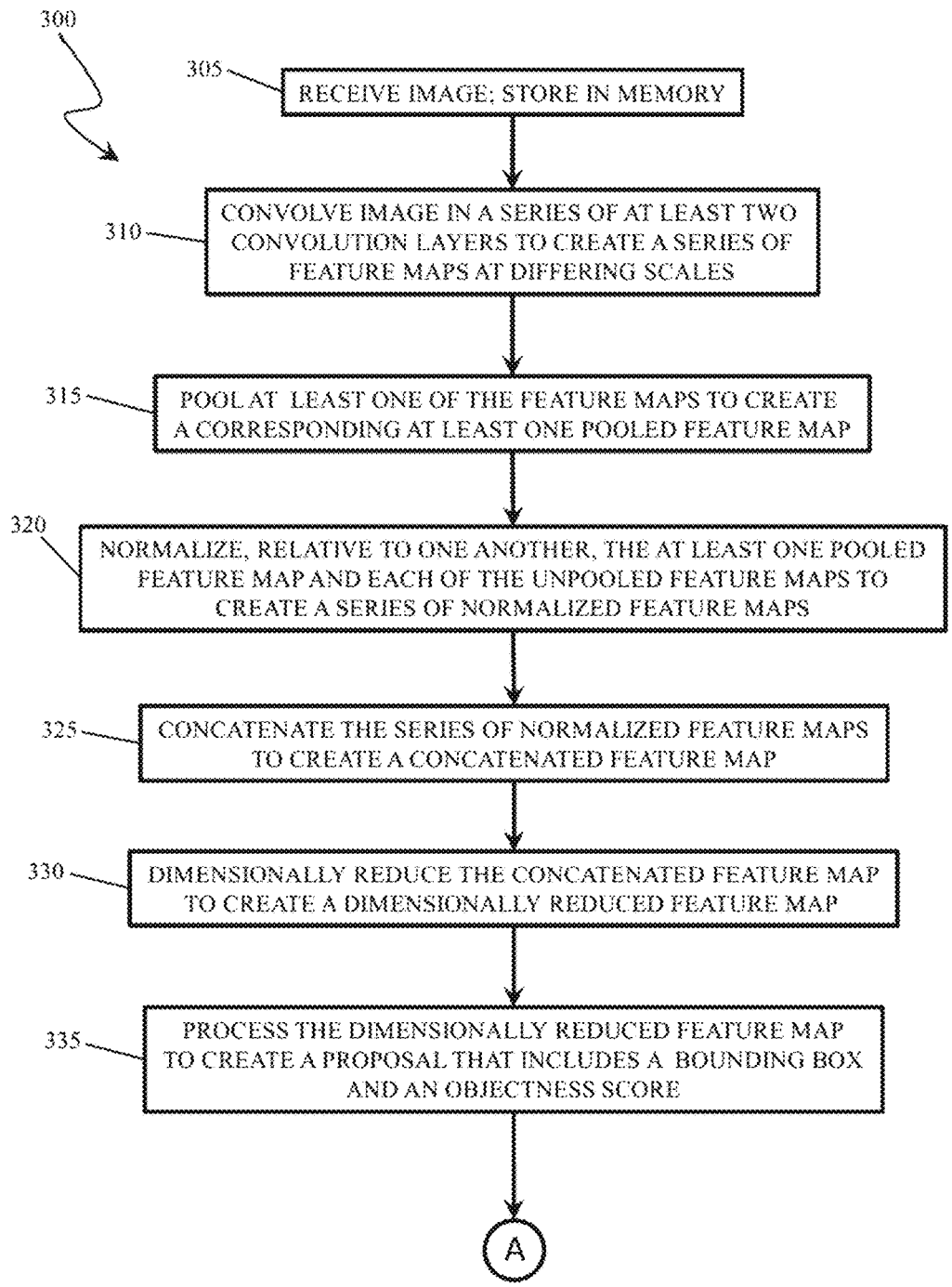
FIGS. 3A-3C depict a flow diagram of an example method of processing an image to detect within the image an object of a desired classification.
Figure 3B:
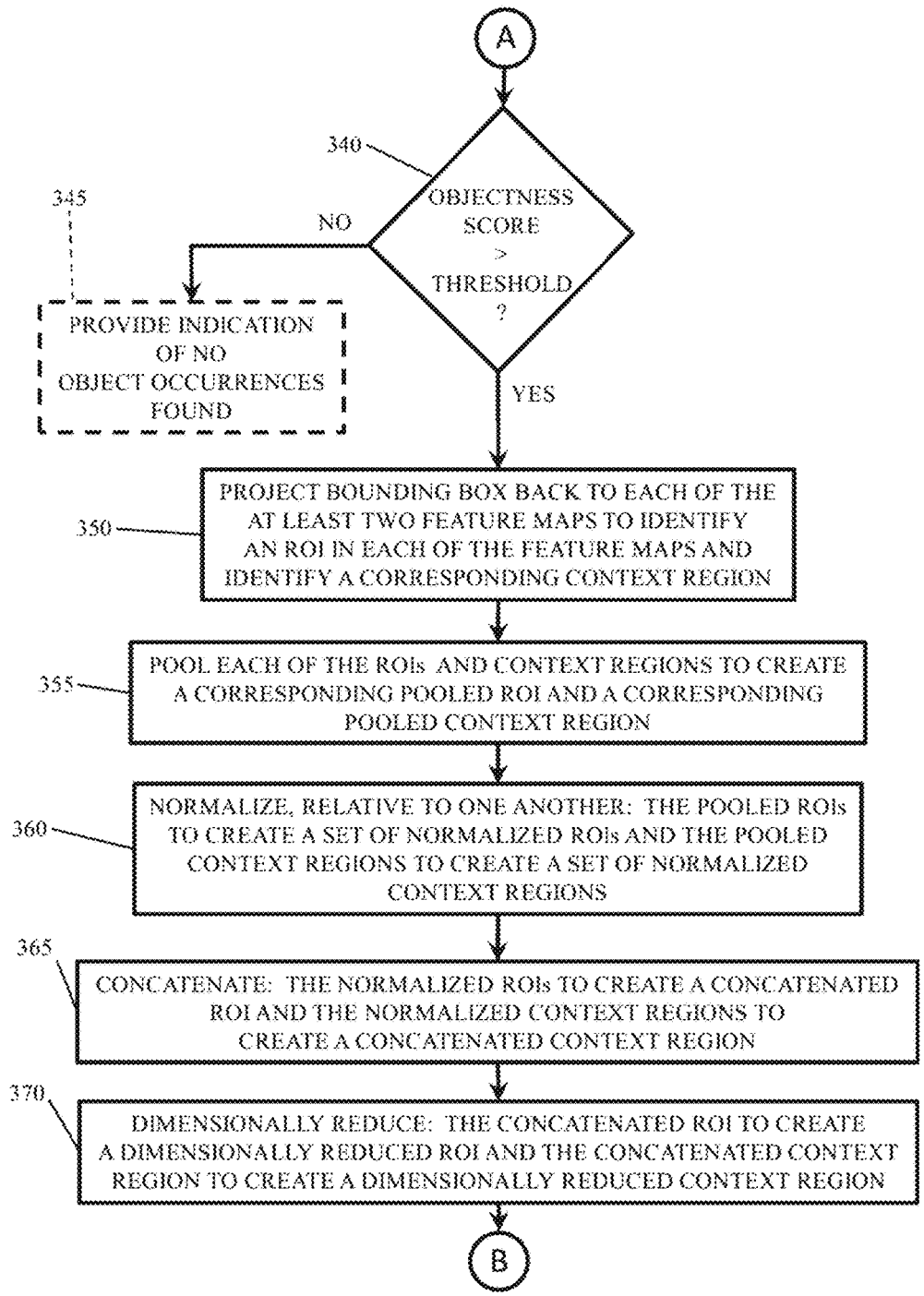
Figure 3C:
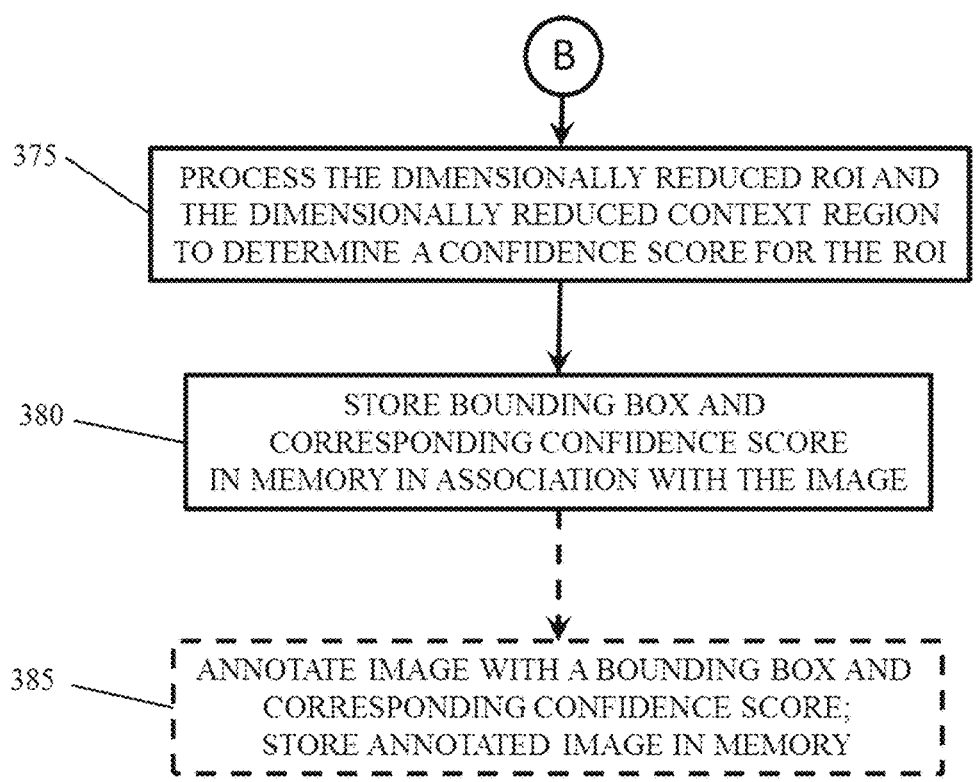

A goal of some embodiments of a CMS-RCNN system of the present disclosure is to detect human faces, or, more generally, objects, captured under various challenging conditions such as strong illumination, heavy occlusion, extreme off-angles, and low resolution. Under these conditions, the current CNN-based detection systems suffer from two major problems, i.e.: 1) tiny faces are hard to identify, and 2) only the face region is taken into consideration for classification. In this section, it is shown why these problems hinder the ability of a face detection system. Then, our proposed network is presented to address these problems by using the MS-RPN and the CMS-CNN, as illustrated in FIGS. 3A-C, described below in detail. Similar to Faster R-CNN, the MS-RPN outputs several region candidates, and the CMS-CNN computes a confidence score and bounding box for each candidate.

III.1. Identifying Tiny Faces

Why are tiny faces hard to be robustly detected by the previous region-based CNNs? The reason is that in these networks both the proposed region and the classification score are produced from one single high-level convolution feature map. This representation does not have enough information for the multiple tasks, i.e., region proposal and ROI detection. For example, Faster R-CNN generates region candidates and does ROI-pooling from the "conv5" layer of the VGG-16 model, which has an overall stride of 16. One issue is that the reception field in this layer is quite large. When the face size is less than 16-by-16 pixels, the corresponding output in "conv5" layer is less than 1 pixel, which is insufficient to encode informative features. The other issue is that as the convolution layers go deeper, each pixel in the feature map gathers more and more information outside the original input region so that it contains lower proportion of information for the region of interest. These two issues together make the last convolution layer less representative for tiny faces.

III.1.1 Multiple Scale Faster-RCNN

The present inventors' solution for this problem is a combination of both global and local features, i.e. multiple scales. In this architecture, the feature maps are incorporated from lower level convolution layers with the last convolution layer for both MS-RPN and CMS-CNN. Features from the lower convolution layer help get more information for the tiny faces, because the stride in the lower convolution layer will not be too small. Another benefit is that both the low-level feature with localization capability and the high-level feature with semantic information are fused together, since face detection needs to localize the face as well as to identify the face. In the MS-RPN, the whole lower level feature maps are down-sampled to the size of the high level feature map and then concatenated with it to form a unified feature map. Then, the dimension of the unified feature map was reduced and used to generate region candidates. In the CMS-CNN, the region proposal is projected into feature maps from multiple convolution layers. ROI-pooling is performed in each layer, resulting in a fixed-size feature tensor. All feature tensors are normalized, concatenated, and dimension-reduced to a single feature blob, which is forwarded to fully connected layers to compute a representation of the region candidate.

II.1.2 Normalization

In both MS-RPN and CMS-CNN, concatenation of feature maps is done using normalization functions, such as the L2 norm function, because the feature maps from different layers have generally different properties in terms of numbers of channels, scale of value, and norm of feature map pixels. Generally, comparing to values in shallower layers, the values in deeper layers are usually too small, which leads to the dominance of shallower layers. In practice, it is impossible for the system to readjust and tune the value from each layer for best performance. Therefore, performing normalization, such as L2 normalization, before concatenation is important for the robustness of the system, because it keeps the value from each layer in roughly the same scale.

In one example, the normalization is performed within each pixel, and each feature map is treated independently:

$$\hat{x} = \frac{x}{\|x\|_2}$$

$$\|x\|_2 = \left(\sum_{i=1}^{d} |x_i|\right)^{\frac{1}{2}}$$

wherein $x$ and $\hat{x}$ stand for the original pixel vector and the normalized pixel vector, respectively, and d stands for the number of channels in each feature map tensor.

During training, scaling factors $\gamma_i$ are updated to readjust the scale of the normalized features. For each channel i, the scaling factor follows:

$$y_i = \gamma_i \hat{x}_i$$

wherein $\gamma_i$ stands for the re-scaled feature value.

Following the back-propagation and chain rule, the update for scaling factor $\gamma$ is:

$$\frac{\partial l}{\partial \hat{x}} = \frac{\partial l}{\partial y} \cdot \gamma$$

$$\frac{\partial l}{\partial x} = \frac{\partial l}{\partial \hat{x}}\left(\frac{1}{\|x\|_2} - \frac{xx^T}{\|x\|_2^3}\right)$$

$$\frac{\partial l}{\partial \gamma_i} = \sum_{y_i} \frac{\partial l}{\partial y_i} \hat{x}_i$$

wherein $y=[y_1, y_2, \ldots, y_d]^T$.

II.1.3 New Layer in Deep Learning Caffe Framework

The system integrates information from lower layer feature maps, here, the third and fourth convolution layers, to extract determinant features for tiny faces. For both parts of an example system, i.e., MS-RPN and CMS-CNN, L2 normalization layers are inserted before concatenation of feature maps and ROIs from the three layers. The features in the feature maps and ROIs are re-scaled to proper values and concatenated to a single feature map and a single ROI, respectively. In one example, the initial scaling factor was set in a special way, following two rules. First, the average scale for each feature map is roughly identical; second, after the following 1×1 convolution, the resulting tensor should have the same average scale as the conv5 layer in the work of Faster R-CNN. As implied, after the following 1×1 convolution, the tensor should be the same as the original architecture in Faster R-CNN, in terms of its size, scale of values and function for the downstream process.

II.2. Integrating Body Context

When humans are searching for faces, they try to look for not only the facial patterns, e.g., eyes, nose, mouth, but also the human bodies. Sometimes a human body makes us more convinced about the existence of a face. In addition, sometimes a human body helps to reject false positives. If we only look at face regions, we may make mistakes identifying them. For example, FIG. 1 shows two cases where body region plays a significant role for correct detection. In the two left-hand images, the presence of a body increases the confidence that the object isolated in the rectangular area in the left image is a face. In the two right-hand images, the lack of presence of a body decreases the confidence that the object isolated in the rectangular area in the left image is a face. This intuition is not only true for a human but also valid in computer vision. Previous research has shown that contextual reasoning is a critical piece of the object recognition puzzle, and that context not only reduces overall detection errors, but, more importantly, the remaining errors made by the detector are more reasonable. Based on this intuition, the network of the present disclosure is designed to make explicit reference to the human body context information in the ROI detection.

In a network of the present disclosure, the contextual body reasoning is implemented by explicitly grouping body information from convolution feature maps. Specifically, additional ROI-pooling operations are performed for each region proposal in convolution feature maps to represent the body context features. Then, same as the face feature tensors, these body feature tensors are normalized, concatenated and dimension-reduced to a single feature blob. In one example, after two fully connected layers, the final body representation is concatenated with the face representation. They together contribute to the computation of confidence score and bounding box regression.

With projected region proposal as the face region, the additional ROI-pooling region represents the body region and satisfies a pre-defined spatial relation with the face region. In order to model this spatial relation, we make a simple hypothesis that if there is a face, there must exist a body, and the spatial relation between each face and body is fixed. This assumption may not be true all the time, but it should cover most of the scenarios since most people we see in the real world are either standing or sitting. Therefore, the spatial relation is roughly fixed between the face and the vertical body. Mathematically, this spatial relation can be represented by four parameters presented in the following equation:

$$t_x = (x_b - x_f)/w_f$$

$$t_y = (y_b - y_f)/h_f$$

$$t_w = \log(w_b/w_f)$$

$$t_h = \log(h_b/h_f)$$

wherein x(*), y(*), w(*), and h(*) denote the two coordinates of the box center, width, and height respectively. And b and f stand for body and face, respectively. $t_x$, $t_y$, $t_w$, and $t_h$ are the parameters. Throughout this one example, the parameters are fixed such that the two projected ROI regions of face and body satisfies a certain spatial ratio illustrated in the famous Vitruvian Man drawing in FIG. 4 of U.S. Provisional Patent Application Ser. No. 62/495,216, filed Sep. 6, 2016, and titled "Very Deep Neural Network with Auto Context R-CNN for Object Detection and Auto Context R-CNN for Unconstrained Face Detection" ("the '216 Provisional Application"), incorporated herein by reference above.

III.3. Information Fusion

It is worth noticing that in an example embodiment of the deep network architecture of the present disclosure there are multiple face feature maps and body context feature maps for each proposed region. An important issue is how to effectively fuse this information, i.e., what computation to apply and in which stage.

Features extracted from differing convolution layers need to be fused together to get a uniform representation. They cannot be naively concatenated due to the overall differences of the numbers of channels, scales of values, and norms of feature map pixels among these layers. The detailed research shows that the deeper layers often contain smaller values than the shallower layers. Therefore, the larger values will dominate the smaller ones, making the system rely too much on shallower features rather than a combination of multiple scale features causing the system to no longer be robust. To address this, in some embodiments, the system takes the multiple scale features and applies L2 normalization along the channel axis of each feature map. Then, since the channel size is different among layers, the normalized feature map from each layer needed to be re-weighted so that their values are at the same scale. After that, the feature maps are concatenated to one single feature map tensor. This modification helps to stabilize the system and increase the accuracy. The channel size of the concatenated feature map is then shrunk to fit right in the original architecture for the downstream fully-connected layers.

Another crucial question is whether to fuse the face information and the body information at an early stage or at the very end of the network. In some embodiments, a late-fusion strategy is used in which face features and body context features are extracted in two parallel pipelines. At the very end of the network, two representations, one each for the face and the body context, are concatenated together to form a long feature vector. Then, this feature vector is forwarded to the fully connected layers to compute confidence score and bounding box regression. Another strategy is an early fusion strategy in which face feature maps and body context feature maps get concatenated right after ROI pooling and normalization. These two strategies both combine the information from face and body context, but late fusion is presently preferred. The reason is that it is desired that the network make decisions in a more semantic space; care is desired more about the existence of the face and the body. The localization information is already encoded in the predefined spatial relation mentioned in Section III.2., above. Moreover empirical experiments have shown that late-fusion strategy works better.

III.4. Example Implementation Details

In one example implementation, a CMS-RCNN of the present disclosure was implemented in the open-source Caffe deep learning framework. The first 5 sets of convolution layers had the same architecture as the deep VGG-16 model, and during training their parameters were initialized from the pre-trained VGG-16. For simplicity, the last convolution layers in set 3, 4, and 5 are referred to as "conv3", "conv4", and "conv5", respectively. All the following layers were connected exclusively to these three layers. In the MS-RPN, we want "conv3", "conv4", and "conv5" to be synchronized to the same size so that concatenation can be applied. So "conv3" is followed by pooling layer to perform down-sampling. Then "conv3", "conv4", and "conv5" are normalized along the channel axis to a learnable re-weighting scale and concatenated together. To ensure training convergence, the initial re-weighting scale needs to be carefully set. Here the initial scales of "conv3", "conv4", and "conv5" are set to be 66.84, 94.52, and 94.52, respectively. In the CMS-CNN, the ROI pooling layer already ensured that the pooled feature maps had the same size. The pooled features were normalized to make sure the downstream values were at reasonable scales when training was initialized. Specifically, features pooled from "conv3", "conv4", and "conv5" were initialized with scale to be 57.75, 81.67, and 81.67, respectively, for both face and body pipelines. The MS-RPN and the CMS-CNN share the same parameters for all convolution layers so that computation could be done once, resulting in higher efficiency. Additionally, in order to shrink the channel size of the concatenated feature map, a 1×1 convolution layer was then employed. Therefore the channel size of final feature map was at the same size as the original fifth convolution layer in Faster R-CNN. Details of aspects of this implementation are described below in connection with FIG. 4.

Figure 2:
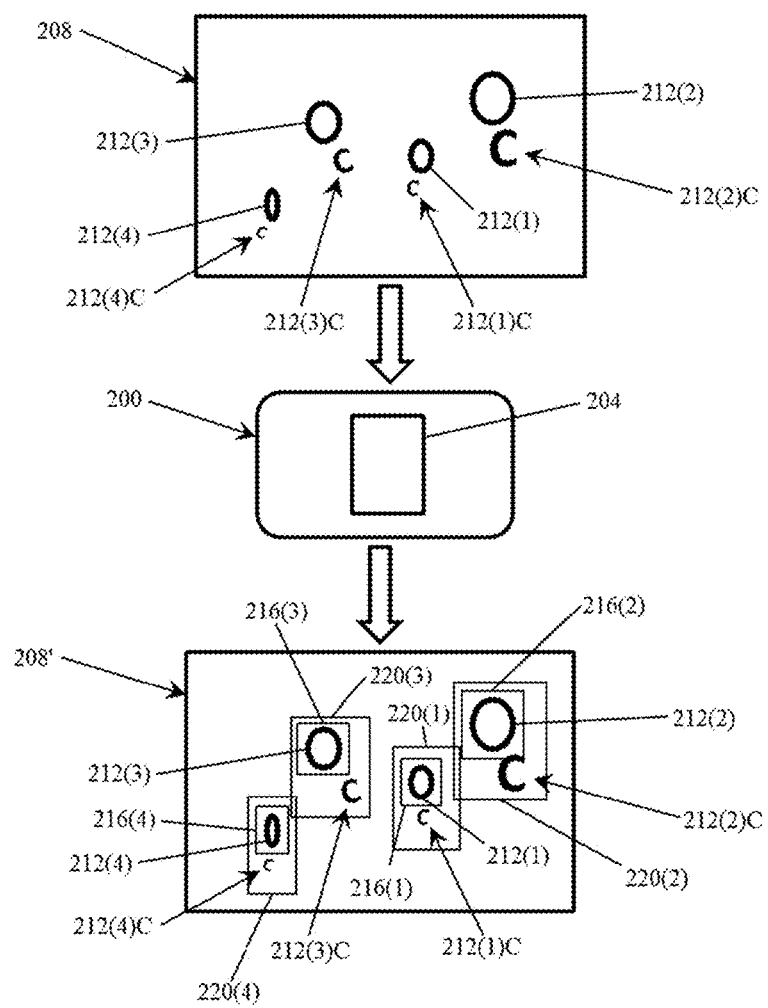
FIG. 2 is a high-level diagram of an object-detection system in accordance with aspects of the present invention illustrating an example input image and a corresponding output image.
Figure 4:
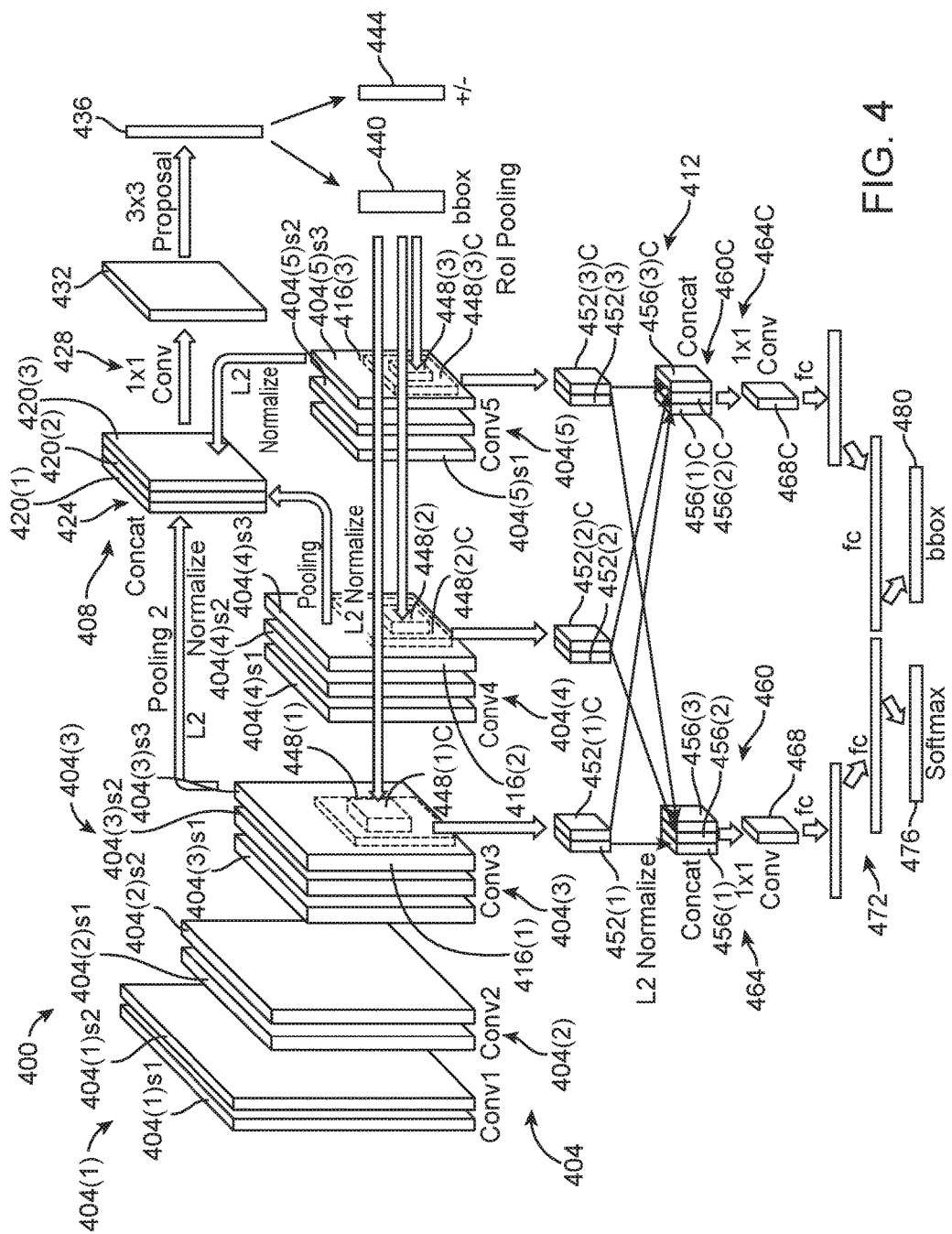
FIG. 4 is a diagram illustrating an architecture of an object-detection process in accordance with the present disclosure.

Referring again to the drawings, FIG. 2 illustrates an example object-detection system 200 made in accordance with of the present invention. At a high level, object-detection system 200 is designed and configured to execute an object-detection process 204 based on a convolutional neural network architecture, an example of which is illustrated in FIG. 4 and described in detail below. Object-detection system 200 is trained to detect each occurrence of one or more objects within an input image, here input image 208. For the sake of simplicity, the object(s) that object-detection system 200 detects are of a single desired classification, such as a human face, a particular type of vehicle, or a particular type of weapon, among others. In more complex versions, object-detection system 200 may be trained to detect multiple classes of objects. In the example shown in FIG. 2, input image 208 contains at least one occurrence of a single class of objects, here multiple occurrences 212(1) to 212(4) of a single class of objects (each designated "O" in FIG. 2 in varying sizes and aspect ratios), wherein the sizes of the occurrences vary from one to another, with occurrence 212(4) being relatively small, as indicated by the relative sizes of the "O"s and corresponding bounding boxes 216(1) to 216(4) in an output version 208' of input image 208, which may be augmented with visible representations of the bounding boxes and/or confidence scores (not shown). It is noted that although bounding boxes 216(1) to 216(4) in this example are shown as being rectangular in shape, a bounding box in another embodiment can be any desired shape, such as circular, oval, triangular, pentagonal, trapezoidal, etc.

In the example shown, each occurrence 212(1) to 212(4) of the desired object is accompanied by visual context 212(1)C to 212(4)C (each designated by "C" in FIG. 2 in varying sizes and orientations) associated with the corresponding occurrence. For example, if the desired object is a human face, each visual context 212(1)C to 212(4)C may be a corresponding human body. Each visual context 212(1)C to 212(4)C is associated with a corresponding context region 220(1) to 220(4) in output version 208' of input image 208. The size of a context region, such as context regions 220(1) to 220(4) can vary based on size of a suspected occurrence of the desired object. Other desired objects will have visual contexts pertinent to them, as those skilled in the art will readily understand. As those skilled in the art will easily appreciate, input image 208 may be any suitable type of digital image, such as a digital or digitized photographic image, a digital or digitized frame of a video or film, a digital scanned image, among others. It is noted that input image 208 may be a portion of a larger image that has been selected for object detection a priori.

Figure 8:
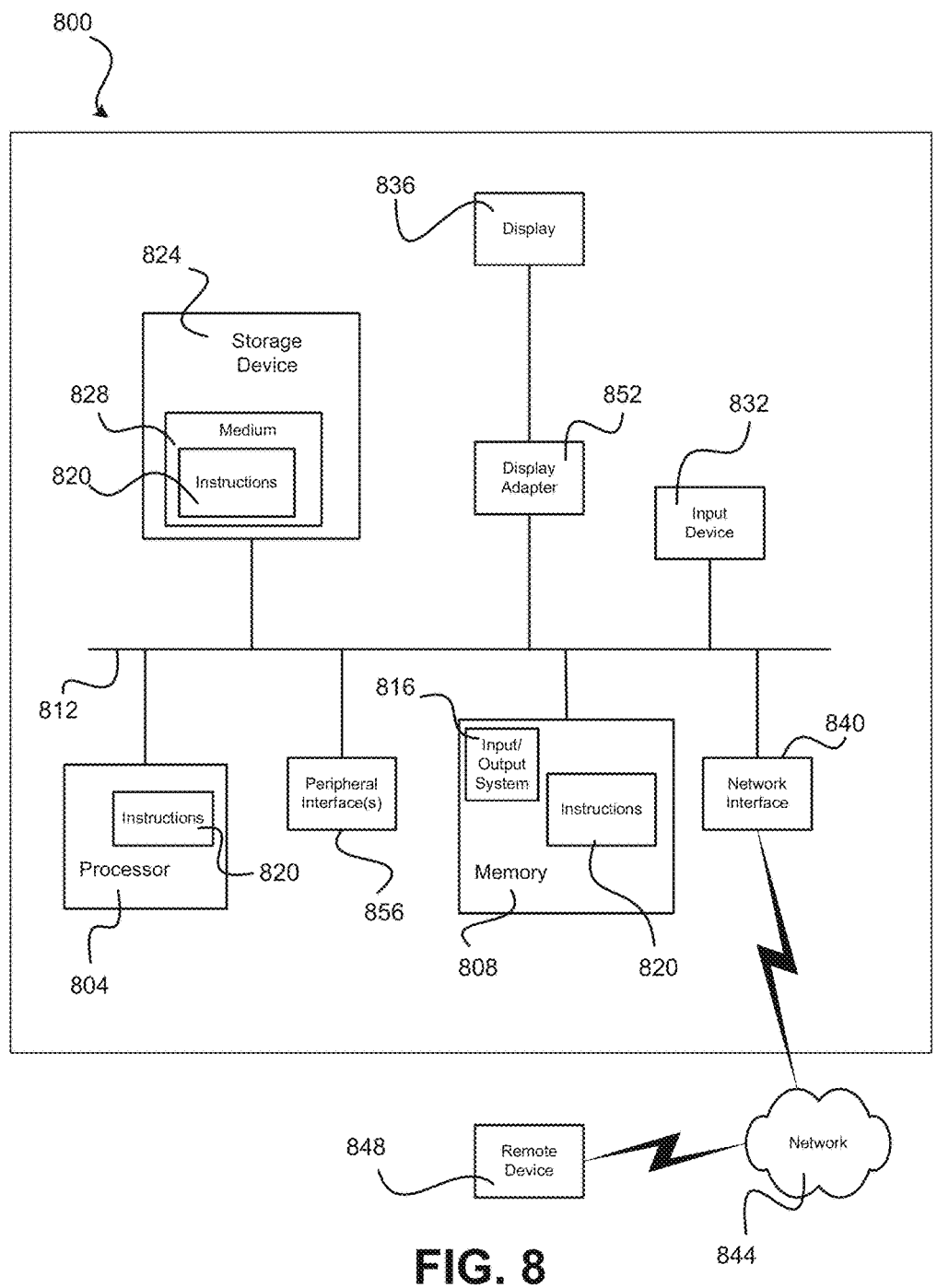
FIG. 8 is a block diagram of a computing system that can contain and/or be used to implement any one or more of the contextual CMS-RCNN methodologies disclosed herein.

Referring to FIGS. 3A-3C, and also occasionally to FIG. 2, FIGS. 3A-3C illustrate an example method 300 of processing an image, such as image 208, to detect within the image an occurrence of an object of a desired classification. Method 300 may begin at step 305 by an object-detection system, such as object-detection system 200 of FIG. 2, receiving an image, such as image 208, and storing it in computer memory. While a computing system is not depicted in FIG. 2, those skilled in the art will readily understand that an object-detection system, such as object-detection system 200 of FIG. 2, is a combination of 1) software suitably coded to perform at least the functions described herein and any other complementary and supplementary functions needed to create a fully functional object-detection system, and 2) hardware designed and configured to execute such software. Suitable hardware for executing such software is ubiquitous in this day in age, such that a description of even one set of hardware is not needed for those skilled in the art to carry out the present invention. That said, some basic examples of suitable hardware include, but are not limited to, a general purpose computing device (e.g., laptop, desktop, tablet, smartphone, server, mainframe, supercomputer), one or more networks of general purpose computing devices, an application-specific computing device or network of such devices, among many others. Such computing devices may each include one or more GPUs to aid in computations, one more central processing units, and/or one or more application-specific processing units, such as one or more application-specific integrated circuits, one or more systems on chip, and/or one or more field-programmable gate arrays, among others. Fundamentally, there are no limitations on the software and computing hardware as long as they are compatible and are able to provide the requisite functionality. For the sake of convenience, any machine memory needed for providing the requisite functionality is referred to herein as "computer memory." Computer memory includes both non-volatile and volatile memory of any known type. FIG. 8 illustrates one example of a computing system 800 that could form all or part of the computing hardware needed to provide a fully functional object-detection system.

At step 310, the object-detection system sequentially convolves the image in a series of at least two convolution layers to create a corresponding series of feature maps of differing scales. Generally, the at least two convolution layers are part of a CNN modeled in the object-detection system. As alluded to above, CNNs are well known in the art and need not be described in detail herein for those skilled in the art to practice the present invention to its fullest scope. It is noted that while at least two convolutional layers are needed for steps of method 300 that follow, in practice, the more-robust object-detection system of the present invention will typically include more than two convolutional layers. In addition, each convolution layer may include multiple convolution sublayers. As an example, FIG. 4 illustrates an example architecture 400 for an object-detection process that includes five convolution layers 404(1) to 404(5), some of which have two convolution sublayers and some of which have three convolution sublayers. Those skilled in the art will readily understand how to build a suitable CNN containing the at least two convolution layers required for step 310, including, but not limited to, selecting convolution parameters, one or more activation functions, and one or more pooling functions, and configuring the fully-connected layer(s) that make decisions. Those skilled in the art will also readily appreciate that, prior to performing step 310, the at least two convolution layers will have been a priori trained with appropriate training images.

At step 315, the object-detection system pools at least one of the feature maps to create a corresponding at least one pooled feature map. The pooling may be any suitable pooling such as max pooling, average pooling, etc. In some embodiments, each of fewer than all of the at least two feature maps may be pooled. For example, only the feature map(s) from the shallowest or shallower convolution layers are pooled. In other embodiments, all of the feature maps selected for normalization and concatenation (see steps 320 and 325) may be pooled.

At step 320, the object-detection system normalizes, relative to one another, each of the at least one pooled feature map and each feature map not pooled to create a series of normalized feature maps. Generally, normalization ensures that the content(s) of one or more (pooled) feature maps is/are not favored over the content(s) of one or more other of the (pooled) feature maps. Normalization can be accomplished using a suitable norm function, such as the L2 norm function or the L1 norm function, among others. At step 325, the object-detection system concatenates the series of normalized feature maps to create a concatenated feature map, and at step 330, the object-detection system dimensionally reduces the concatenated feature map to create a dimensionally reduced feature map. Dimensional reduction at step 330 may be performed using any suitable dimension reducing technique, such as a 1×1 convolution.

At step 335, the object-detection system processes the dimensionally reduced feature map in a first set of one or more fully connected layers to create a proposal that comprises 1) a bounding box corresponding to a suspected object of the desired classification in the image, and 2) an objectness score for the suspected object. As those skilled in the art will readily appreciate, when step 335 is executed, the first set of fully connected layers will have been trained on the desired classification using known neural network training techniques. It is noted that the bounding box will typically be rectangular for problem simplification. However, the shape of the bounding box need not be rectangular. The objectness score may represent the relative probability that the suspected object within the bounding box is actually a member of the desired class. Those skilled in the art will readily understand how to configure the set of fully connected layers to generate the bounding box and determine the objectness score, as these functions can be configured similarly to known like functions from conventional RPNs.

It is noted that steps 310 to 335 may be considered to be steps within a MS-RPN, which may be generally similar to conventional RPNs. However, MS-RPN is much more robust than conventional RPNs by virtue of the use of multiple feature maps of differing scale and the attendant normalization and concatenation.

At step 340, the object-detection system determines whether or not the objectness score exceeds a predetermined threshold. The predetermined threshold may be a learned value from training. If at step 340 the objectness score does not exceed the threshold, at step 345 the object-detection system may provide an indication that it has not found any objects of the desired classification within the image. Such indication may be of any suitable type, such as a message displayed to a user on an electronic display, a flag sent to another software application, or marking on the image, among many other possibilities. However, if at step 340 the objectness SCORE exceeds the predetermined threshold, at step 350 the object-detection system projects the bounding box back to each of the at least two feature maps of differing scale to identify an ROI in each of the at least two feature maps. At step 350, the object-detection system also identifies a corresponding context region for each bounding box.

At step 355, the object-detection system pools each of the ROIs to create a corresponding pooled ROI and each of the corresponding context regions to create a corresponding pooled context region. The pooling may be any suitable pooling such as max pooling, average pooling, etc. At step 360, the object-detection system normalizes, relative to one another, the pooled ROIs to create a set of normalized ROIs and normalized, relative to one another, the pooled context regions to create a set of normalized context regions. Generally, normalization ensures that the content of any of the pooled ROIs and context regions is not favored over the content of any other of the pooled ROIs and context regions. Normalization can be accomplished using a suitable norm function, such as the L2 norm function or the L1 norm function, among others. At step 365, the object-detection system concatenates the series of normalized ROIs to create a concatenated ROI and concatenates the series of normalized context regions to create a concatenated context region, and at step 370, the object-detection system dimensionally reduces the concatenated ROI to create a dimensionally reduced ROI and dimensionally reduces the concatenated context region to create a dimensionally reduced context region. Dimensional reduction at step 370 may be performed using any suitable dimension reducing technique, such as a 1×1 convolution.

At step 375, the object-detection system processes the dimensionally reduced ROI and the dimensionally reduced context region in a second set of fully connected layers to generate and determine a confidence score for the ROI. As those skilled in the art will readily appreciate, when the object-detection system executes step 375, the second set of fully connected layers will have been trained on the desired classification using known neural network training techniques. Any suitable classifier, such as a softmax classifier, can be used for determining the confidence score for the presence of an object of the desired classification.

At step 380, the object-detection system may store the bounding box and corresponding confidence score in memory in association with the input image. This information may be stored in any one or more of a variety of ways, such as metadata for the image and/or, as illustrated at step 385, the object-detection system may annotate the image with a visual depiction of the bounding box and the corresponding confidence score and store the image and the annotations in the computer memory. The object-detection system may perform other operations at step 380, such as displaying a message to a user on a visual display, issue a flag, and/or display the image annotated with the bounding box to the user, among other things.

It is noted that steps 355 to 375 may be considered to be steps within a CMS-RCNN, which may be generally similar to conventional Faster RCNNs. However, CMS-RCNN is much more robust than conventional Faster RCNNs by virtue of the use of multiple ROIs and context regions of differing scale, the attendant normalization and concatenation, and the use of both multiple ROIs and multiple context regions in determining a confidence score. In addition, it is noted that the at least two convolution layers mentioned above will typically be shared between the MS-RPN and CMS-RCNN. Alternatively, the at least two convolution layers may be dedicated only to the MS-RPN, with a corresponding at least two separate and distinct convolution layer of the same scales being dedicated to the CMS-RCNN. It is further noted that while method 300 is directed to detecting objects of only one classification, those skilled in the art will readily understand how to modify the method to detect multiple classifications of objects. Similarly, while method 300 is described above as only detecting a single occurrence of an object of the desired classification or no such occurrence, the method can detect multiple occurrences of the desired classification within the image, if the image contains such multiple occurrences, or at least appears to the object-detection system to contain such multiple occurrences.

As mentioned above, FIG. 4 illustrates an example CNN-based architecture 400 for an object-detection system of the present invention. It is noted that architecture 400 is not complete, as only salient features and aspects are illustrated for simplicity. Those skilled in the art will readily be able to augment architecture 400 as needed to implement a fully functional object-detection system that functions in accordance with the present disclosure. For example, those skilled in the art will readily understand how to implement an input layer, activation layers (e.g., rectified linear unit (ReLU) layers), pooling layers, fully connected neural network layers, one or more output layers, etc.), as those features are well known in the art of neural networks generally and visual-learning neural networks more specifically. In this vein and as noted above, those skilled in the art will readily understand how to build a suitable object-detection system based on architecture, including, but not limited to, selecting convolution parameters, selecting one or more activation functions, selecting one or more pooling functions, and configuring the fully-connected layer(s) that make decisions. Those skilled in the art will also readily understand the processes for training a CNN-based object-detection system of the present invention.

In this example, architecture 400 includes a CNN 404 that is shared between an MS-RPN 408 and a CMS-RCNN 412. In this example, CNN 404 includes five groups of convolution layers 404(1) to 404(5), with each of the layer group 404(1) and 404(2) including two convolution layers 404(1)$s$1, 404(1)$s$2 and 404(2)$s$1, 404(2)$s$2, respectively, and each of the layer groups 404(3) to 404(5) including three convolution layers 404(3)$s$1, 404(3)$s$2, 404(3)$s$3, and 404(4)$s$1, 404(4)$s$2, 404(4)$s$3 and 404(5)$s$1, 404(5)$s$2, 404(5)$s$3, respectively. Convolution layers 404(3)$s$3, 404(4)$s$3, and 404(5)$s$3 produce a corresponding set of feature maps 416(1) to 416(3) of sequentially reducing scale.

In this example, MS-RPN 408 is configured to pool feature maps 416(1) and 416(2) of shallower convolution layers 404(3) and 404(4) using a suitable pooling function, whereas the MS-RPN does not pool feature map 416(3) from deeper convolution layer 404(5). This is so in this example because feature maps 416(1) and 416(2) are downscaled such that they have the same spatial resolution as feature map 416(3). However, in other embodiments, more or fewer of feature maps 416(1) to 416(3) may be pooled as desired in a particular design. Pooled feature maps (not shown) and feature map 416(3) are normalized relative to one another to create normalized feature maps 420(1) to 420(3). As noted above relative to method 300, any suitable pooling function, such as max pooling, and any suitable norm function, such as an L2 norm function, can be used. The normalized feature maps 420(1) to 420(3) are concatenated with one another to form a concatenated feature map 424, which is then dimensionally reduced, for example, using a 1×1 convolution 428, to obtain a dimensionally reduced feature map 432. In this example, dimensionally reduced feature map 432 is then processed to extract features from a 3×3 local region, here using a suitable 3×3 kernel, to highlight features present in dimensionally reduced feature map to propose a feature vector 436 for each spatial location in feature map 432. Highlighted feature vector 436 is then processed by fully connected layers (not shown) to determine one or more bounding boxes (only one bounding box 440 shown), each of which is suspected to contain an occurrence of an object agnostic to class (e.g., human face, chair, vehicle, weapon, etc.). The fully connected layers also determine an objectness score 444 for each bounding box 440 they have identified.

Each bounding box, here just bounding box 440, suspected of containing an occurrence of the desired class, is then projected back to each of feature maps 416(1) to 416(3) on convolution layers 404(3) to 404(5) used to create highlighted feature map 436. This back-projecting is used to isolate a corresponding ROI 448(1) to 448(3) in each of feature maps 416(1) to 416(3) and also to identify a corresponding context region 448(1)C to 448(3)C in each of these feature maps. Based on bounding box 440, each of these ROIs 448(1) to 448(3) is suspected to contain an occurrence of an object of the desired class, and each of context regions 448(1)C to 448(3)C may contain visual context associated with the desired class of object to be detected. ROIs 448(1) to 448(3) are pooled to create pooled ROIs 452(1) to 452(3), which are then normalized to create normalized ROIs 456(1) to 456(3). Context regions 448(1)C to 448(3)C are also pooled to create pooled context regions 452(1)C to 452(3)C, which are then normalized to create normalized context regions 456(1)C to 456(3)C. Any suitable pooling and normalization functions can be used, such as max pooling and L2 normalization, among others. Normalized ROIs 456(1) to 456(3) are concatenated with one another to form a concatenated ROI 460, which is then dimensionally reduced, for example, using a 1×1 convolution 464, to obtain a dimensionally reduced ROI 468. Similarly, normalized context regions 456(1)C to 456(3)C are concatenated with one another to form a concatenated context region 460C, which is then dimensionally reduced, for example, using a 1×1 convolution 464C, to obtain a dimensionally reduced context region 468C.

In this example, dimensionally reduced ROI feature map 468 and dimensionally reduced context feature map 468C are then processed by fully connected layers 472 (also indicated by "fc") to determine a confidence score 476 for the suspected occurrence of the object in the ROI. The fully connected layers may also determine a bounding box 480 based on the fully connected layer processing of dimensionally reduced ROI feature map 468 and dimensionally reduced context feature map 468C.

IV. Experimental Results

This section presents the face detection benchmarking using an instantiation of a CMS-RCNN object-detection system of the present disclosure on the Wider Face dataset and the Face Detection Data Set and Benchmark (FDDB) database. The Wider Face dataset is experimented with high degree of variability. Using this database, the tested system robustly outperformed strong baseline methods, including Two-stage CNN, Multi-scale Cascade CNN, Faceness, and ACF, by a large margin. The experiments show that the attendant model trained on a Wider Face dataset generalized well enough to the FDDB database. The trained model consistently achieved competitive results against the recent state-of-the-art face detection methods on this database, including HyperFace, DP2MFD, CCF, Faceness, NPDFace, MultiresHPM, DDFD, CascadeCNN, ACF-multiscale, Pico, HeadHunter, Joint Cascade, Boosted Exemplar, and PEP-Adapt.

IV.1. Experiments on Wider Face Dataset

IV.1.1. Data description

Wider Face is a public face detection benchmark dataset. It contains 393,703 labeled human faces from 32,203 images collected based on 61 event classes from the Internet. The database has many human faces with a high degree of pose variation, large occlusions, low-resolutions, and strong lighting conditions. The images in this database are organized and split into three subsets, namely, training, validation, and testing. Each contains 40%, 10%, and 50%, respectively, of the original databases. The images and the ground-truth labels of the training and the validation sets are available online for experiments. However, in the testing set, only the testing images (not the ground-truth labels) are available online. All detection results are sent to the database server for evaluating and receiving the Precision-Recall (PR) curves.

In the testing, the CMS-RCNN object-detection system was trained on the training set of the Wider Face dataset containing 159,424 annotated faces collected in 12,880 images. The trained model on this database was used in testing of all databases.

IV.1.2. Testing and Comparison

During the testing phase, the face images in the testing set were divided into three parts based on their detection rates on EdgeBox. In other words, face images were divided into three levels according to the difficulties of the detection, i.e., Easy, Medium, and Hard. The present CMS-RCNN model was compared against recent strong face detected methods, namely, Two-stage CNN, Multiscale Cascade CNN, Faceness, and AFC. All of these methods are trained on the same training set and tested on the same testing set.

Figure 5A:
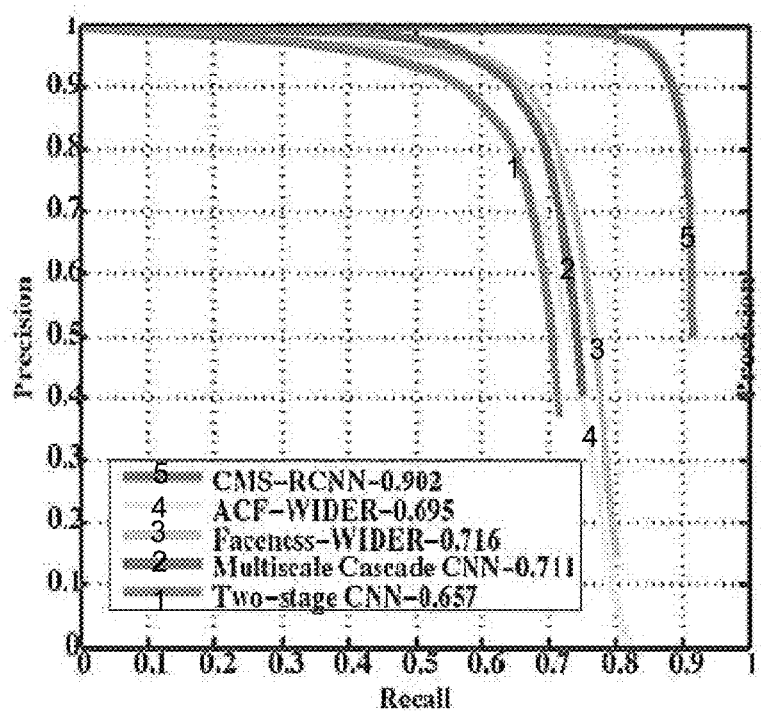
FIGS. 5A to 5C are graphs of precision versus recall for, respectively, easy, medium, and hard difficulty levels of detection for the tested CMS-RCNN method, Two-stage CNN, Multiscale Cascade CNN, Faceness, and the Aggregate Channel Features method.
Figure 5B:
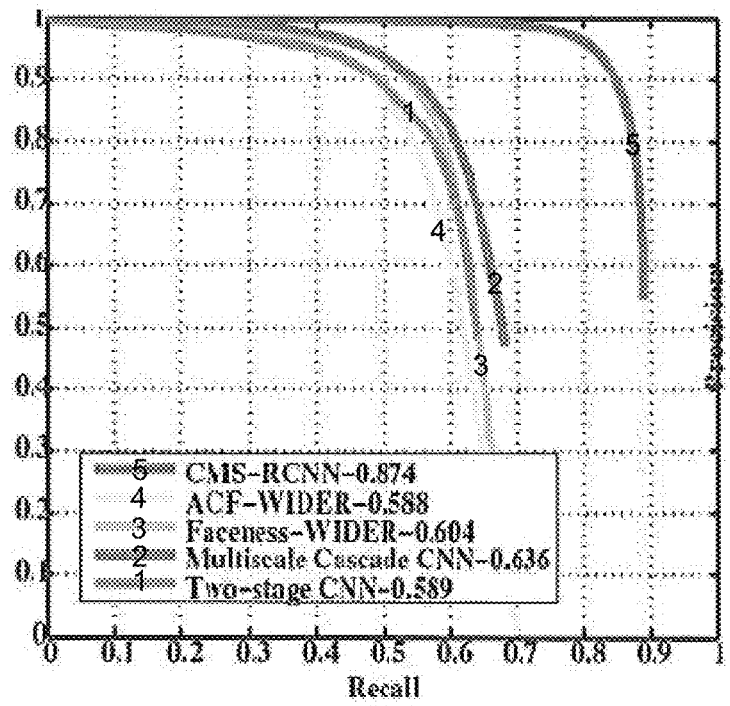
Figure 5C:
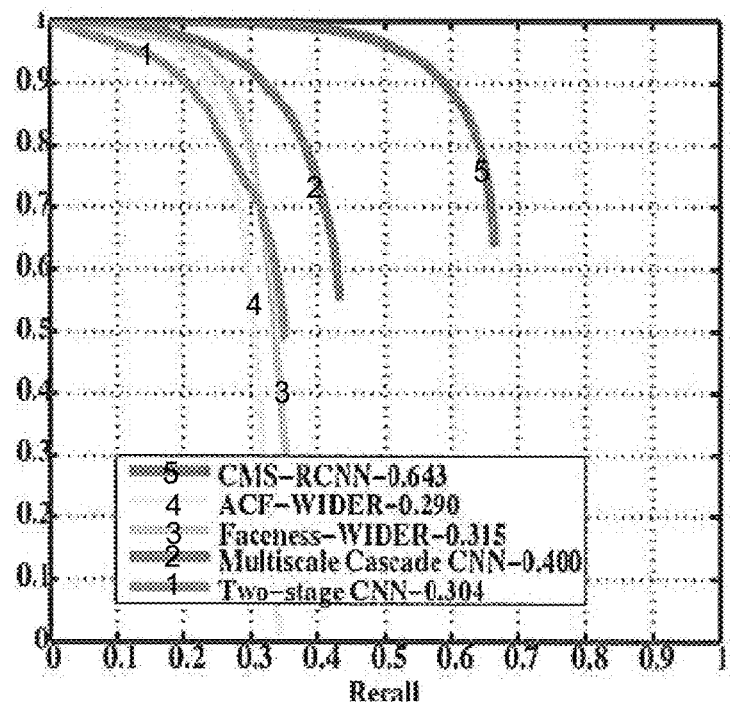

The PR curves and Average Precision (AP) values are shown in FIGS. 5A-5C. The present object-detection system outperformed those strong baselines by a large margin. It achieved the best average precision in all level faces, i.e., AP=0.902 (Easy), 0.874 (Medium), and 0.642 (Hard), and outperforms the second best baseline by 26.0% (Easy), 37.4% (Medium) and 60.8% (Hard). These results suggest that as the difficulty level goes up, CMS-RCNN can detect challenging faces better. So, it has the ability to handle difficult conditions, hence is more close to human detection levels. FIG. 8 of the '216 Provisional Application shows some examples of face-detection results using a CMS-RCNN method of the present disclosure on this database.

IV.1.3. With Context Vs. Without Context

As shown in Section III.2, human vision can benefit from additional contextual information for better detection and recognition. In this section, it is shown how explicit contextual reasoning in the network can help improve the model performance.

Figure 6:
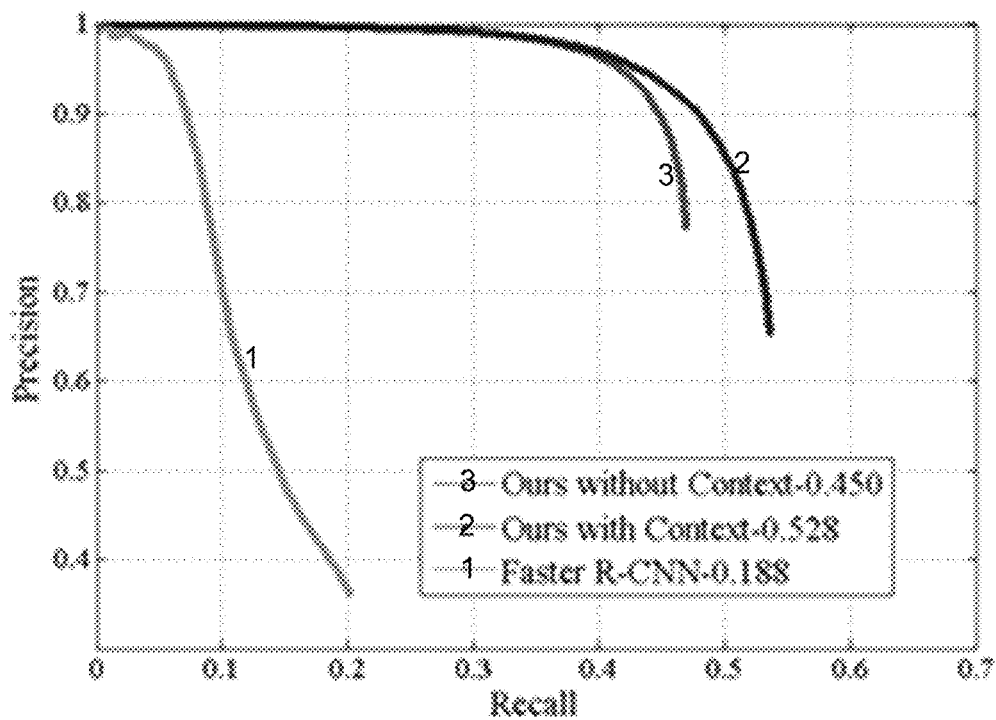
FIG. 6 is a graph of precision versus recall for CMS-RCNN without context, CMS-RCNN with context, and the Faster R-CNN baseline, showing that the CMS-RCNN methodology outperforms the baseline by a wide margin.

To prove this, the model was tested with and without body context information on the validation of the Wider Face dataset. The model without body context was implemented by removing the context pipeline and only used the representation from the face pipeline to compute the confidence score and the bounding box regression. A comparison of performance is illustrated in FIG. 6. The Faster R-CNN method was set as a baseline.

Starting from 0 in Recall, two curves of the present models were overlapped at first, which means that the two models performed as well as each other on some easy faces. Then the curve of the model without context starts to drop quicker than the model having context, suggesting that the model having context can handle the challenging conditions better when faces become more and more difficult. Thus, eventually the model having context achieved a higher recall value. Additionally, the context model produces a longer PR curve, which means that contextual reasoning can help find more faces.

IV.1.4. Visualization of False Positives

As it is well known that PR curves get dropped due to false positives, there is interest in the false positives produced by the tested CMS-RCNN model. For example, what type of object can fool the model into treating it as a face, and is the fooling due to over-fitting, data bias, or mislabeling?

In order to visualize the false positives, the CMS-RCNN model was tested on the Wider Face validation set and all of the false positives were picked according to the ground truth. Then, those false positives were sorted by the confidence scores in descending order. The top 20 false positives were chosen as illustrated in FIG. 9 of the '216 Provisional Application. Because their confidence scores were high, they are objects most likely to cause the model to make mistakes. It turned out that most of the false positives were actually human faces caused by mislabeling, which is a problem of the dataset itself. For other false positives, the errors made by the model were rather reasonable. They all had the pattern of a human face as well as the shape of a contextual human body.

IV.2. Experiments on FDDB Face Database

To show that the CMS-RCNN methodology of the present disclosure generalizes well to other database, the proposed CMS-RCNN was also benchmarked on the FDDB database. The FDDB databases is a standard database for testing and evaluating face detection algorithms. It contains annotations for 5,171 faces in a set of 2,845 images taken from the Faces in the Wild dataset. Most of the images in the FDDB database contain fewer than 3 faces that are clear or slightly occluded. The faces generally have large sizes and high resolutions compared to Wider Face. The same model trained on Wider Face training set presented in Section IV.1 was used to perform the evaluation on the FDDB database.

Figure 7:
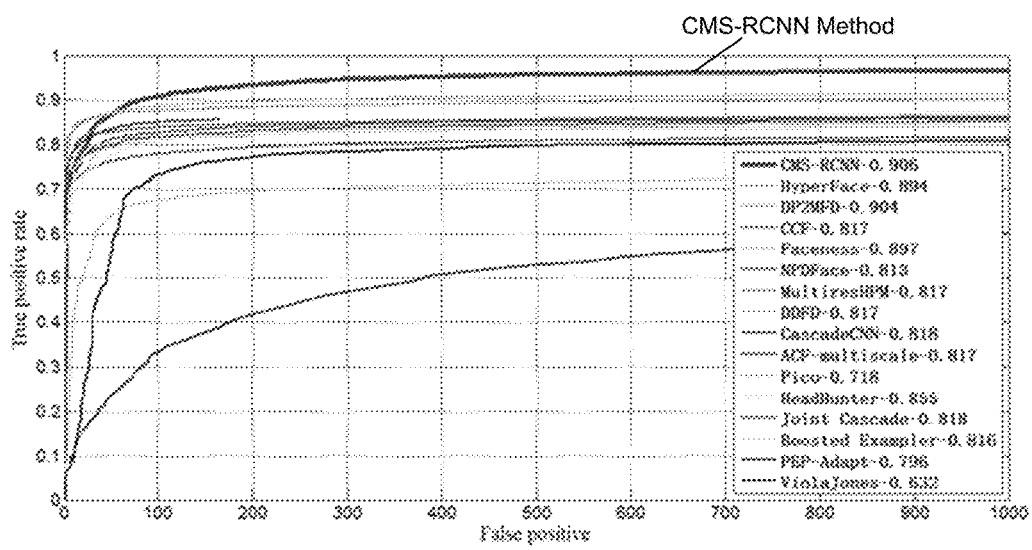
FIG. 7 is a graph of true positive rate versus false positive rate for the tested MS-FRCNN method and many other face-detection methods.

The evaluation was performed based on the discrete criterion following the same rules in PASCAL VOC Challenge, i.e., if the ratio of the intersection of a detected region with an annotated face region was greater than 0.5, it was considered as a true positive detection. The evaluation proceeded following the FDDB evaluation protocol and was compared against the published methods provided in the protocol, namely, HyperFace, DP2MFD, CCF, Faceness, NPDFace, MultiresHPM, DDFD, CascadeCNN, ACF-multiscale, Pico, Head Hunter, Joint Cascade, Boosted Exemplar, and PEP-Adapt. The present CMS-RCNN approach outperformed most of the published face detection methods and achieved a very high recall rate comparing against all other methods (as shown FIG. 7). This is concrete evidence to demonstrate that CMS-RCNN robustly detects unconstrained faces. FIG. 10 of the '216 Provisional Application shows some examples of the face detection results using the proposed CMS-RCNN on the FDDB dataset.

V. Example Computing System

It is to be noted that any one or more of the aspects and embodiments described herein may be conveniently implemented in and/or using one or more machines (e.g., one or more computers, one or more communications network devices, one or more electrical distribution network devices, any combination and/or network thereof, among other things) programmed according to the teachings of the present specification, as will be apparent to those of ordinary skill in the computer arts. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, a laptop computer, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

FIG. 8 shows a diagrammatic representation of one embodiment of a computing device in the exemplary form of a computer system 800 within which a set of instructions for performing any one or more of the aspects and/or methodologies of the present disclosure may be executed. It is also contemplated that multiple computing devices may be utilized to implement a specially configured set of instructions for causing one or more of the devices to contain and/or perform any one or more of the aspects and/or methodologies of the present disclosure. Computer system 800 includes a processor 804 and a memory 808 that communicate with each other, and with other components, via a bus 812. Bus 812 may include any of several types of bus structures including, but not limited to, a memory bus, a memory controller, a peripheral bus, a local bus, and any combinations thereof, using any of a variety of bus architectures.

Memory 808 may include various components (e.g., machine-readable media) including, but not limited to, a random access memory component, a read only component, and any combinations thereof. In one example, a basic input/output system 816 (BIOS), including basic routines that help to transfer information between elements within computer system 800, such as during start-up, may be stored in memory 808. Memory 808 may also include (e.g., stored on one or more machine-readable media) instructions (e.g., software) 820 embodying any one or more of the aspects and/or methodologies of the present disclosure. In another example, memory 808 may further include any number of program modules including, but not limited to, an operating system, one or more application programs, other program modules, program data, and any combinations thereof.

Computer system 800 may also include a storage device 824. Examples of a storage device (e.g., storage device 824) include, but are not limited to, a hard disk drive, a magnetic disk drive, an optical disc drive in combination with an optical medium, a solid-state memory device, and any combinations thereof. Storage device 824 may be connected to bus 812 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 824 (or one or more components thereof) may be removably interfaced with computer system 800 (e.g., via an external port connector (not shown)). Particularly, storage device 824 and an associated machine-readable medium 828 may provide nonvolatile and/or volatile storage of machine-readable instructions, data structures, program modules, and/or other data for computer system 800. In one example, software 820 may reside, completely or partially, within machine-readable medium 828. In another example, software 820 may reside, completely or partially, within processor 804.

Computer system 800 may also include an input device 832. In one example, a user of computer system 800 may enter commands and/or other information into computer system 800 via input device 832. Examples of an input device 832 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 832 may be interfaced to bus 812 via any of a variety of interfaces (not shown) including, but not limited to, a serial interface, a parallel interface, a game port, a USB interface, a FIREWIRE interface, a direct interface to bus 812, and any combinations thereof. Input device 832 may include a touch screen interface that may be a part of or separate from display 836, discussed further below. Input device 832 may be utilized as a user selection device for selecting one or more graphical representations in a graphical interface as described above.

A user may also input commands and/or other information to computer system 800 via storage device 824 (e.g., a removable disk drive, a flash drive, etc.) and/or network interface device 840. A network interface device, such as network interface device 840, may be utilized for connecting computer system 800 to one or more of a variety of networks, such as network 844, and one or more remote devices 848 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 844, may employ a wired and/or a wireless mode of communication. In general, any network topology may be used. Information (e.g., data, software 820, etc.) may be communicated to and/or from computer system 800 via network interface device 840.

Computer system 800 may further include a video display adapter 852 for communicating a displayable image to a display device, such as display device 836. Examples of a display device include, but are not limited to, a liquid crystal display (LCD), a cathode ray tube (CRT), a plasma display, a light emitting diode (LED) display, and any combinations thereof. Display adapter 852 and display device 836 may be utilized in combination with processor 804 to provide graphical representations of aspects of the present disclosure. In addition to a display device, computer system 800 may include one or more other peripheral output devices including, but not limited to, an audio speaker, a printer, and any combinations thereof. Such peripheral output devices may be connected to bus 812 via a peripheral interface 856. Examples of a peripheral interface include, but are not limited to, a serial port, a USB connection, a FIREWIRE connection, a parallel connection, and any combinations thereof.

The foregoing has been a detailed description of illustrative embodiments of the invention. It is noted that in the present specification and claims appended hereto, conjunctive language such as is used in the phrases "at least one of X, Y and Z" and "one or more of X, Y, and Z," unless specifically stated or indicated otherwise, shall be taken to mean that each item in the conjunctive list can be present in any number exclusive of every other item in the list or in any number in combination with any or all other item(s) in the conjunctive list, each of which may also be present in any number. Applying this general rule, the conjunctive phrases in the foregoing examples in which the conjunctive list consists of X, Y, and Z shall each encompass: one or more of X; one or more of Y; one or more of Z; one or more of X and one or more of Y; one or more of Y and one or more of Z; one or more of X and one or more of Z; and one or more of X, one or more of Y and one or more of Z.

Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve aspects of the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A method of processing an image to detect the presence of one or more objects of a desired classification in the image, the method being performed in an object-detection system and comprising:
    receiving the image and storing the image in computer memory;
    sequentially convolving the image in a series of at least two convolution layers to create a corresponding series of feature maps of differing scales;
    pooling at least one of the feature maps to create a corresponding at least one pooled feature map;
    normalizing, relative to one another, the at least one pooled feature map and each of the feature maps not pooled to create a series of normalized feature maps;
    concatenating the series of normalized feature maps together with one another to create a concatenated feature map;
    dimensionally reducing the concatenated feature map to create a dimensionally reduced feature map;
    processing the dimensionally reduced feature map in a first set of fully connected layers to create a proposal comprising a bounding box corresponding to a suspected object of the desired classification in the image and an objectness score for the suspected object, wherein the first set of fully connected layers has been trained on the desired classification;
    if the objectness score exceeds a predetermined threshold, then projecting the bounding box back to each of the at least two feature maps to identify a region of interest in each of the at least two feature maps;
    identify a context region for each region of interest;
    pooling each of the regions of interest to create a corresponding pooled region of interest;
    pooling each of the context regions to create a corresponding pooled context region;
    normalizing, relative to one another, the pooled regions of interest to create a set of normalized regions of interest;
    normalizing, relative to one another, the pooled context regions to create a set of normalized context regions;
    concatenating the normalized regions of interest with one another to create a concatenated region of interest;
    concatenating the normalized context regions with one another to create a concatenated context region;
    dimensionally reducing the concatenated region of interest to create a dimensionally reduced region of interest;
    dimensionally reducing the concatenated context region to create a dimensionally reduced context region;
    processing the dimensionally reduced region of interest and the dimensionally reduced context region in a second set of fully connected layers to generate a determined classification for the region of interest, wherein the second set of fully connected layers is trained on the desired classification; and
    if the determined classification corresponds to the desired classification, then annotating the image with an identification of the bounding box and storing the image and the identification in the computer memory.

2. The method according to claim 1, wherein the normalizing of the at least one pooled feature map and each of the feature maps not pooled is performed using an L2 normalization.

3. The method according to claim 2, wherein the normalization is performed within each pixel and each of the at least two feature maps is treated independently as follows:

$$\hat{x} = \frac{x}{\|x\|_2}$$

$$\|x\|_2 = \left(\sum_{i=1}^{d} |x_i|\right)^{\frac{1}{2}}$$

wherein x and $\hat{x}$ stand for a corresponding original pixel vector and a corresponding normalized pixel vector, respectively, and d stands for a number of channels in each feature map tensor.

4. The method according to claim 3, further comprising training the object detection system, wherein during the training, scaling factors $\gamma_i$ are updated to readjust the scale of the normalized features according to:

$$y_i = \gamma_i \hat{x}_i$$

wherein $y_i$ stands for the re-scaled feature value.

5. The method according to claim 1, wherein the processing of the convolved region of interest to generate a determined classification includes using a softmax function.

6. The method according to claim 1, wherein the desired classification is a human face.

7. The method according to claim 6, wherein each context region is located based on likelihood of containing at least a portion of a human body.

8. The method according to claim 7, wherein the human body is assumed to have a fixed spatial relation the human face.

9. The method according to claim 8, wherein the fixed spatial relation has the human body vertical.

10. The method according to claim 9, wherein the fixed spatial relation is represented by a set of parameters as follows:

$$t_x = (x_b - x_f)/w_f$$

$$t_y = (y_b - y_f)/h_f$$

$$t_w = \log(w_b/w_f)$$

$$t_h = \log(h_b/h_f)$$

wherein x(*), y(*), w(*), and h(*) denote the two coordinates of the box center, width, and height respectively, b and f stand for the human body and the human face, respectively, and $t_x$, $t_y$, $t_w$, and $t_h$ are the parameters.

11. The method according to claim 1, wherein the annotating of the image to identify the bounding box includes adding a visual depiction of the bounding box to the image.

12. A computer-readable storage medium containing computer-executable instructions for performing a method of processing an image to detect the presence of one or more objects of a desired classification in the image, the method for being performed in an object-detection system executing the computer-executable instructions and comprising:
   receiving the image and storing the image in computer memory;
   sequentially convolving the image in a series of at least two convolution layers to create a corresponding series of feature maps of differing scales;
   pooling at least one of the feature maps to create a corresponding at least one pooled feature map;
   normalizing, relative to one another, the at least one pooled feature map and each of the feature maps not pooled to create a series of normalized feature maps;
   concatenating the series of normalized feature maps together with one another to create a concatenated feature map;
   dimensionally reducing the concatenated feature map to create a dimensionally reduced feature map;
   processing the dimensionally reduced feature map in a first set of fully connected layers to create a proposal comprising a bounding box corresponding to a suspected object of the desired classification in the image and an objectness score for the suspected object, wherein the first set of fully connected layers has been trained on the desired classification;
   if the objectness score exceeds a predetermined threshold, then projecting the bounding box back to each of the at least two feature maps to identify a region of interest in each of the at least two feature maps;
   identify a context region for each region of interest;
   pooling each of the regions of interest to create a corresponding pooled region of interest;
   pooling each of the context regions to create a corresponding pooled context region;
   normalizing, relative to one another, the pooled regions of interest to create a set of normalized regions of interest;
   normalizing, relative to one another, the pooled context regions to create a set of normalized context regions;
   concatenating the normalized regions of interest with one another to create a concatenated region of interest;
   concatenating the normalized context regions with one another to create a concatenated context region;
   dimensionally reducing the concatenated region of interest to create a dimensionally reduced region of interest;
   dimensionally reducing the concatenated context region to create a dimensionally reduced context region;
   processing the dimensionally reduced region of interest and the dimensionally reduced context region in a second set of fully connected layers to generate a determined classification for the region of interest, wherein the second set of fully connected layers is trained on the desired classification; and
   if the determined classification corresponds to the desired classification, then annotating the image with an identification of the bounding box and storing the image and the identification in the computer memory.

13. The computer-readable storage medium according to claim 12, wherein the normalizing of the at least one pooled feature map and each of the feature maps not pooled is performed using an L2 normalization.

14. The computer-readable storage medium according to claim 13, wherein the normalization is performed within each pixel and each of the at least two feature maps is treated independently as follows:

$$\hat{x} = \frac{x}{\|x\|_2}$$

$$\|x\|_2 = \left(\sum_{i=1}^{d} |x_i|\right)^{\frac{1}{2}}$$

wherein x and $\hat{x}$ stand for a corresponding original pixel vector and a corresponding normalized pixel vector, respectively, and d stands for a number of channels in each feature map tensor.

15. The computer-readable storage medium according to claim 14, further comprising training the object detection system, wherein during the training, scaling factors $\gamma_i$ are updated to readjust the scale of the normalized features according to:

$$y_i = \gamma_i \hat{x}_i$$

wherein $\gamma_i$ stands for the re-scaled feature value.

16. The computer-readable storage medium according to claim 12, wherein the processing of the convolved region of interest to generate a determined classification includes using a softmax function.

17. The computer-readable storage medium according to claim 12, wherein the desired classification is a human face.

18. The computer-readable storage medium according to claim 17, wherein each context region is located based on likelihood of containing at least a portion of a human body.

19. The computer-readable storage medium according to claim 18, wherein the human body is assumed to have a fixed spatial relation the human face.

20. The computer-readable storage medium according to claim 19, wherein the fixed spatial relation has the human body vertical.

21. The computer-readable storage medium according to claim 20, wherein the fixed spatial relation is represented by a set of parameters as follows:

$$t_x = (x_b - x_f)/w_f$$

$$t_y = (y_b - y_f)/h_f$$

$$t_w = \log(w_b/w_f)$$

$$t_h = \log(h_b/h_f)$$

wherein x(*), y(*), w(*), and h(*) denote the two coordinates of the box center, width, and height respectively, b and f stand for the human body and the human face, respectively, and $t_x$, $t_y$, $t_w$, and $t_h$ are the parameters.

22. The computer-readable storage medium according to claim 12, wherein the annotating of the image to identify the bounding box includes adding a visual depiction of the bounding box to the image.

* * * * *